United States Patent [19]

Zastrow

[11] 4,272,552

[45] Jun. 9, 1981

[54] PROCESS FOR PRODUCING A LOW CARBOHYDRATE, LOW CALORIE BEER

[75] Inventor: Klaus D. Zastrow, St. Louis County, Mo.

[73] Assignee: Anheuser-Busch, Incorporated, St. Louis, Mo.

[21] Appl. No.: 765,968

[22] Filed: Feb. 7, 1977

[51] Int. Cl.³ .......................... C12C 9/00; C12C 11/04
[52] U.S. Cl. ....................................... 426/13; 426/16; 426/29; 426/477
[58] Field of Search ..................... 426/11, 13, 16, 29, 426/477

[56] References Cited

U.S. PATENT DOCUMENTS

| | | | |
|---|---|---|---|
| 2,442,806 | 6/1948 | Gluek | 426/13 |
| 3,373,040 | 3/1968 | Gluek | 426/13 |
| 3,717,471 | 2/1973 | Stat et al. | 426/16 X |
| 3,852,495 | 12/1974 | Schimpf et al. | 426/13 X |

FOREIGN PATENT DOCUMENTS 9783 of 1897 United Kingdom .
387639 2/1933 United Kingdom .

*Primary Examiner*—David M. Naff
*Attorney, Agent, or Firm*—Gravely, Lieder & Woodruff

[57] ABSTRACT

A low calorie, low carbohydrate beer is produced by carrying out a separate mashing of malt at temperatures which substantially inactivate microorganisms without deactivating enzymes of the malt and adding this mash to wort in a primary and/or secondary fermentor to produce a final beer having a reduced carbohydrate and calorie content.

7 Claims, No Drawings

PROCESS FOR PRODUCING A LOW CARBOHYDRATE, LOW CALORIE BEER

BACKGROUND OF THE INVENTION

Numerous so-called low carbohydrate low calorie or light beers have recently been introduced to the market. It is believed that certain of these may be made by a process similar to the process described in Gablinger U.S. Pat. No. 3,379,534. The Gablinger process involves adding the enzyme, amyloglucosidase, to the materials being brewed during the mash and/or fermentation period, in order to split a portion of the dextrins which would otherwise remain in the final beer. The Gablinger patent states that the alpha and beta amylases, which are the enzymes provided by the barley malt used in brewing, cannot provide any of the features of his invention.

Manufacture of diabetic or low sugar beer is also known. Distler U.S. Pat. No. 2,223,444 relates to the production of low sugar beer by boiling the mash and the hopped wort in vacuum at a low temperature so as to preserve the enzyme complex of the malt. Temperatures of 64°–66° C. are not exceeded. This process requires special equipment and procedures not normally used in a brewery. Also considerable time (up to three months) is required until the desired degree of fermentation is reached.

Schimpf U.S. Pat. No. 3,852,495 concerns the manufacture of dietary or diabetic beer of low alcohol and low carbohydrate content and a low calorie value by boiling off alcohol after a first fermentation and then adding additional yeast and a solution of diastase extracted from malt to the partially fermented mixture. This process requires many additional steps not conventionally used in a brewery.

Pauls U.S. Pat. No. 2,782,147 relates to a special beer of high alcoholic content and low extractive matter (carbohydrates) content. Pauls uses special materials and a two stage fermentation with diatase added at the start of the main fermentation and again at the completion of the main fermentation. Additional diastase extract and yeast can be added during storage. The Pauls process requires special malt, hops, yeast and water. The Pauls patent does not disclose the details of his method for preparing the diatase extract.

Thomas U.S. Pat. No. 2,146,240 also shows a special diatetic and dietary beer made by a double fermentation. The main fermentation uses *Saccharomyces cerevisiae* and the secondary fermentation uses a yeast which ferments the dextrins such as, *Schizosaccharomyces pombe* or *Saccharomyces thermantitonum*.

Gluek U.S. Pat. No. 3,373,040 shows the production of malt liquor products of low protein, sugar, and real extract contents. The process consists of preparing separately a cooker mash of malt cereal products and water and a main mash and heating the main mash at 42°–45° R. A small portion of the liquid from the main mash is removed and some of this is added to the boiled hopped wort during cooling and the remainder is added during fermentation. As a final step, the fermented liquid is diluted and treated with emulsifiers, hop extract, foam builder and liquid chillproof.

None of the prior processes results in a naturally and conventionally brewed beer of the type contemplated by this invention.

Accordingly, it is a principal object of this application to provide a process for producing a naturally and conventionally brewed beer which is low in carbohydrates and calories. It is a further object to provide such a process using only materials commonly used in a brewing process. Still a further object is to provide a process for brewing low calorie, low carbohydrate beer which uses regular equipment normally found in a brewing plant and results in a process substantially free of contaminating microorganisms. These and other objects and advantages will become apparent hereinafter.

This invention comprises a process for brewing a light type beer comprising separate mashing of a portion of malt at temperatures which substantially inactivate the microorganisms of the malt without deactivating the enzymes, and adding this mash to the wort during or before fermentation. The invention further comprises the products and processes hereinafter described and claimed.

DETAILED DESCRIPTION

The present invention utilizes natural ingredients commonly used in the brewing process, and manipulates the process to produce a beer with reduced calories (about 95–100 per 12 fl. oz.), with reduced carbohydrate content (about 1.2–1.8% by weight), and an alcoholic content of 3.5–4.0% by volume.

One method of accomplishing the foregoing is to prepare a wort whose original gravity results in the desired calorie range in the finished beer. This causes the finished beer to be lower in caloric content. To this wort, after hopping and boiling, is added a small portion of separately mashed malt immediately before or during fermentation to reduce the carbohydrate content of the beer.

Conventional brewing materials and conventional brewhouse procedures are used in the preparation of the wort. Thus, the raw materials can be barley malt exclusively, or a combination of barley malt and unmalted adjuncts such as rice, corn grits or other carbohydrate sources. The mashing procedure follows conventional general brewing practices suitable to the raw material combination being used. Also the lautering, wort boiling and hopping procedures are conventional.

As mentioned, the original gravity of the wort can be adjusted in the brewhouse so that the calorie content of the finished product is in the desired range, or the wort can be brewed-in more concentrated, and adjustment by addition of naturally carbonated purified blending water is then made later in the process, for example, after fermentation and storage. Cooling and yeasting of the wort is also conventional.

The malt to be added to the fermentor can be regular ground barley malt, or flour made from regular or high diastatic malt. Diastatic malt is barley malt which has been treated under special conditions to increase the enzyme activity. The barley malt flour is regular barley malt which has been refined to remove the husks, etc. The amount is from about 0.5 to about 1.5% by weight of the total raw material blend (malt plus any adjuncts) used for the brew. It is slurried with about four times its amount of water on a weight basis, and the slurry is kept agitated at a temperature of about 45° to 55° C., preferably 50° C., for a time of about ½ hour to 2½ hours, preferably 1 hour. The heat treatment inactivates about 99.9% of the microorganisms present in the malt liquid. However, it does not injure the enzymes present in the malt and allows a practically microorganism-free, but enzymatically active, material to be added to the main fermentation. It is also possible to add the material to the secondary fermentor, or to both the main fermentor and the secondary fermentor.

When added to the fermenting liquid, the malt enzymes continue to break down unfermentable carbohydrates, mainly dextrins, into fermentable sugar. The final product thus has proportionally less carbohydrates than is usually found in beer. The increased fermentable sugars also allows the alcoholic content of the beer to be higher than it would have been without the addition of the malt.

When the caloric content of the beer is determined by adjusting the initial gravity of the wort, the gravity of the boiled, hopped, yeasted, cooled wort has a solids content or gravity of about 7.3° to about 7.7° Plato. Preferably this is about 7.5° Plato.

When the caloric content of the beer is determined by diluting the fermented liquid with carbonated deaerated water, the gravity of the cooled wort is between about 10° and 18° Plato, preferably about 15° Plato. This is not as critical as when a low gravity process is used because the final caloric content can be adjusted by adding more or less water.

The carbonated water is made naturally by dissolving $CO_2$ produced from beer fermentation in deaerated water and using this $CO_2$ saturated water to add back to the beer to produce the final product of 95–100 calories per 12 oz. serving.

EXAMPLE NO. 1

10,000 lbs. of ground barley malt is mixed with 5,000 gal. of water at 35° C. After 30 minutes, the temperature is raised stepwise to 45° C., 65° C., and 74° C. Mashing is completed after a total time of 2½ hours. This mash is then filtered in a lauter tub or equivalent equipment, sparged, and the total filtrate collected in the brew kettle. The mixture is boiled with 100 lbs. of hops under atmospheric pressure for about 85 minutes. At this time the liquid has a specific gravity of about 1.0286, equivalent to a solids content of 7.2 degree Plato. After straining off the hops and settling out the trub, the wort is cooled and yeasted with approximately 1 lb. of brewer's yeast per barrel (31 gal.) of wort. About 350 barrels of wort with a solid content of about 7.5 degree Plato are obtained.

At this time 175 lbs. of ground barley malt are mashed-in with 87½ gal. of water at 50° C. The mixture is kept for 60 minutes at this temperature and then added to the main fermentor.

As soon as the apparent solids content reaches 1.5 degree Plato, the fermenting wort is transferred to a storage tank containing beechwood chips. The main fermentation and post fermentation (storage) run for a total of about 25 days. The beer is then removed from the beechwood chips, chill-proofed, filtered, and packaged. The beer has a caloric content of about 97 per 12 oz. serving, an alcoholic content of about 3.7% by volume, a carbohydrate content of about 1.5% by weight and a protein content of about 0.25% by weight.

EXAMPLE NO. 2

7,700 lbs. of ground barley malt is mixed with 3,850 gal. of water at 35° C. in the mash tub. Simultaneously, 2,000 lbs. of brewer's rice and 300 lbs. of ground barley malt are mixed with 1,150 gal. of water at 35° C. in a cooker. While the temperature in the mash tub remains at 35° C., the cooker mash is brought to boil, boiled for 15 minutes and then combined with the mash in the mash tub. The temperature of the combined mash is 65° C. After resting at this temperature for about 20 minutes, the temperature is raised to 74° C. The total mashing cycle is 2½ hours. Further processing is the same as in Example No. 1.

EXAMPLE NO. 3

15,400 lbs. of ground barley malt is mixed with 5,500 gal. of water at 35° C. in the mash tub. Simultaneously, 4,000 lbs. of brewer's rice and 600 lbs. of ground barley malt are mixed with 1,650 gal. of water at 35° C. in a cooker. The temperature in the mash tub remains at 35° C., and the cooker mash is brought to boil. After 15 minutes boil, the two mashes are combined and the temperature of this mix is brought to 65° C. After resting at this temperature for about 20 minutes, the temperature is raised to 74° C. Total mashing time is 2½ hours. The mash is filtered in a lauter tub or equivalent equipment, and the filtrates are collected in the brew kettle. The wort is boiled with 220 lbs. of hops under atmospheric pressure for about 85 minutes. At this time, the liquid has a specific gravity of about 1.0600, equivalent to a solids content of about 14.75 degree Plato. After straining off the hops and settling out the trub the wort is cooled and yeasted with approximately 1.5 lbs. of brewer's yeast per barrel of wort. About 340 bbls. of wort with a solids content of about 15.0 degree Plato are obtained.

At this time, 175 lbs. of ground barley malt are mashed-in with 87½ gal. of water at 50° C. The mixture is kept for 60 minutes at this temperature and is then added to the fermentor. When the apparent solids content is at 2.5° Plato the fermenting wort is transferred to a storage tank containing beechwood chips. The main fermentation and post fermentation (storage) run for a total of about 30 days. The beer is then removed from the beechwood chips, chillproofed, blended with the same volume of deaerated, carbonated water, filtered, and packaged.

EXAMPLE NO. 4

20,500 lbs. of ground barley malt is mixed with 7,000 gal. of water at 35° C. This is mashed as in Example No. 1 for about 2½ hours, filtered, sparged, and collected in the brew kettle. This mixture is boiled with 200 lbs. of hops for about 85 minutes, strained, and cooled. The wort has a solids content of about 15.0° Plato. To this is added about 10% of hopped, boiled, and cooled wort made from barley malt and rice adjuncts also with a solids content of about 15.0° Plato. To the combined wort is added about 1.5 lbs. of yeast per barrel. About 375 barrels of wort are in the fermentor.

At this time, 175 lbs. of ground barley malt are mashed-in with 87½ gal. of water at 50° C. The mixture is kept for 60 minutes at this temperature and is then added to the fermentor. When the apparent solids content is at 2.5° Plato the fermenting wort is transferred to a storage tank containing beechwood chips. The main fermentation and post fermentation (storage) run for a total of about 30 days. The beer is then removed from the beechwood chips, chillproofed, blended with the same volume of deaerated, carbonated water, filtered, and packaged.

EXAMPLE NO. 5

Wort is prepared as in Examples No. 1, 2, 3 or 4 and fermented in the main fermentor, but without adding the separate malt mash at this stage of the process. Instead, after preparing the separate malt mash as in Example No. 1, it is added to the fermenting liquid during transfer from the main fermentor to the storage tank.

EXAMPLE NO. 6

Wort is prepared and fermented as in Examples No. 1, 2, 3 or 4. A further separate malt mash addition is made during transfer from the main fermentor to the storage tank. The amount added is half of that added to the main fermentor.

EXAMPLE NO. 7

Wort is prepared and fermented as in Examples No. 1, 2, 3, 4, 5 or 6, but the malt added to the main fermentor and/or the storage tank is flour from high diastatic malt instead of ground barley malt.

What is claimed is:

1. A process of brewing a low carbohydrate low calorie beer comprising the steps of
   (a) preparing a hopped, boiled wort, which after straining and cooling, has a gravity of about 10° to about 18° Plato,
   (b) preparing a separate malt mash, said mash containing about 0.5 to about 1.5% by weight of solids based on the weight of raw materials of the wort,
   (c) treating the separate malt mash about 45° to about 55° C. for about 30 to about 150 minutes to substantially inactivate all of the microorganisms present while still retaining the enzyme activity,
   (d) combining the wort and the treated separate malt mash with yeast to ferment the wort to produce a fermented wort
   (e) preparing a purified carbonated water by dissolving $CO_2$ from a beer fermentation in deaerated water, and
   (f) combining said carbonated water with the fermented wort from step (d) to produce a low calorie, low carbohydrate beer of about 95 to about 100 calories per 12 oz. serving.

2. The process of claim 1 wherein the malt is selected from barley malt, malt flour, high diastatic malt, and high diastatic malt flour.

3. The process of claim 1 wherein the separate malt mash is added to the wort and yeast in a main fermentor.

4. The process of claim 1 wherein the wort and yeast are fermented in a main fermentor to produce a primarily fermented wort containing yeast and thereafter the separate malt mash is added to the primarily fermented wort containing yeast in a secondary fermentor or storage tank.

5. The process of claim 3 wherein fermenting in the main fermentor produces a primarily fermented wort containing yeast and a second addition of separate malt mash is made to the primarily fermented wort containing yeast in a secondary fermentor or storage tank.

6. A process of brewing a low carbohydrate low calorie beer comprising the steps of
   (a) preparing a hopped, boiled wort, which after straining and cooling has an original gravity of about 10° to about 18° Plato,
   (b) preparing a separate malt mash, said mash containing from about 0.5% to about 1.5% by weight of malt based on the weight of raw materials of the wort,
   (c) treating the separate malt mash at about 45° to about 55° C. for about 30 minutes to about 150 minutes to kill substantially all of the microorganisms present while still retaining the enzyme activity,
   (d) combining the wort and the treated separate malt mesh with yeast to ferment the wort to reduce the carbohydrate content and produce a concentrated low calorie, low carbohydrate fermented wort,
   (e) preparing purified carbonated water by dissolving $CO_2$ from a beer fermentation in deaerated water, and
   (f) combining said carbonated water with the fermented wort to produce a low calorie, low carbohydrate beer of about 3.5 to about 4.0% alcohol by volume, about 1.2 to about 1.8% carbohydrates by weight, 0.15 to about 0.35% protein by weight, and about 95 to about 100 calories per 12 oz. serving.

7. The process of claim 6 wherein the wort is made from a mixture of barley malt mash and boiled brewer's rice mash.

* * * * *